US011146620B2

(12) United States Patent
Bosch et al.

(10) Patent No.: US 11,146,620 B2
(45) Date of Patent: Oct. 12, 2021

(54) SYSTEMS AND METHODS FOR INSTANTIATING SERVICES ON TOP OF SERVICES

(71) Applicant: Cisco Technology, Inc., San Jose, CA (US)

(72) Inventors: Peter Bosch, Aalsmeer (NL); Jeffrey Napper, Delft (NL); Alessandro Duminuco, Milan (IT); Michael Francis O'Gorman, Redwood City, CA (US); Sean Chandler, North Scituate, RI (US); Roman Sorokin, Moscow (RU); David Delano Ward, Somerset, WI (US); Baton Daullxhi, Los Altos, CA (US); Florin Stelian Balus, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/899,179

(22) Filed: Feb. 19, 2018

(65) Prior Publication Data
US 2019/0082004 A1    Mar. 14, 2019

Related U.S. Application Data

(60) Provisional application No. 62/558,668, filed on Sep. 14, 2017.

(51) Int. Cl.
*H04L 29/08*    (2006.01)
*G06F 9/50*    (2006.01)
(Continued)

(52) U.S. Cl.
CPC .............. *H04L 67/10* (2013.01); *G06F 8/35* (2013.01); *G06F 8/60* (2013.01); *G06F 9/5055* (2013.01);
(Continued)

(58) Field of Classification Search
CPC ... H04L 67/10; G06F 8/35; G06F 8/60; G06F 9/5055; G06F 8/71; G06F 2209/5015
See application file for complete search history.

(56) References Cited

U.S. PATENT DOCUMENTS 8,589,557 B1    11/2013    Labat et al.
9,128,792 B2 *   9/2015    Kimmet .................... G06F 8/61
(Continued)

OTHER PUBLICATIONS

International Search Report and Written Opinion from the International Searching Authority, dated Feb. 27, 2019, 14 pages, for corresponding International Patent Application No. PCT/US18/51225.

*Primary Examiner* — Tonia L Dollinger
*Assistant Examiner* — Joseph M Cousins
(74) *Attorney, Agent, or Firm* — Polsinelli

(57) ABSTRACT

The present disclosure involves systems and methods for (a) model distributed applications for multi-cloud deployments, (b) derive, by way of policy, executable orchestrator descriptors, (c) model underlying (cloud) services (private, public, server-less and virtual-private) as distributed applications themselves, (d) dynamically create such cloud services if these are unavailable for the distributed application, (e) manage those resources equivalent to the way distributed applications are managed; and (f) present how these techniques are stackable. As applications may be built on top of cloud services, which themselves can be built on top of other cloud services (e.g., virtual private clouds on public cloud, etc.) even cloud services themselves may be considered applications in their own right, thus supporting putting cloud services on top of other cloud services.

20 Claims, 10 Drawing Sheets

(51) Int. Cl.
  *G06F 8/35* (2018.01)
  *G06F 8/60* (2018.01)
  *G06F 8/71* (2018.01)
(52) U.S. Cl.
  CPC ........ *G06F 8/71* (2013.01); *G06F 2209/5015* (2013.01)

(56) References Cited

U.S. PATENT DOCUMENTS

| | | |
|---|---|---|
| 2007/0294364 A1 | 12/2007 | Mohindra et al. |
| 2011/0137805 A1* | 6/2011 | Brookbanks ......... G06Q 50/188 705/80 |
| 2013/0346543 A1* | 12/2013 | Benantar ............... G06F 9/5055 709/217 |
| 2015/0033134 A1* | 1/2015 | Bragstad ................ H04L 67/36 715/736 |
| 2016/0197835 A1* | 7/2016 | Luft ...................... H04L 67/327 709/223 |
| 2016/0218938 A1 | 7/2016 | Gupte et al. |
| 2017/0149875 A1* | 5/2017 | Iyengar ................. H04L 47/762 |
| 2017/0201569 A1 | 7/2017 | Fu et al. |
| 2017/0257432 A1 | 9/2017 | Fu et al. |
| 2018/0095778 A1* | 4/2018 | Aydelott ............ G06Q 10/0637 |
| 2018/0145923 A1* | 5/2018 | Chen ....................... H04L 47/70 |

* cited by examiner

SYSTEMS AND METHODS FOR INSTANTIATING SERVICES ON TOP OF SERVICES

RELATED APPLICATIONS

This application claims priority under 35 U.S.C. § 119 from U.S. provisional application No. 62/558,668 entitled "SYSTEMS AND METHODS FOR INSTANTIATING SERVICES ON TOP OF SERVICES," filed on Sep. 14, 2017, the entire contents of both of which are fully incorporated by reference herein for all purposes.

TECHNICAL FIELD

The present disclosure relates generally to the field of computing, and more specifically, to an orchestrator for distributing applications across one or more cloud or other computing systems.

BACKGROUND

Many computing environments or infrastructures provide for shared access to pools of configurable resources (such as compute services, storage, applications, networking devices, etc.) over a communications network. One type of such a computing environment may be referred to as a cloud computing environment. Cloud computing environments allow users, and enterprises, with various Computing capabilities to store and process data in either a privately owned cloud or on a publicly available cloud in order to make data accessing mechanisms more efficient and reliable. Through the cloud environments, software applications or services may be distributed across the various cloud resources in a manner that improves the accessibility and use of such applications and services for users of the cloud environments.

Operators of cloud computing environments often host many different applications from many different tenants or clients. For example, a first tenant may utilize the cloud environment and the underlying resources and/or devices for data hosting while another client may utilize the cloud resources for networking functions. In general, each client may configure the cloud environment for their specific application needs. Deployment of distributed applications may occur through an application or cloud orchestrator. Thus, the orchestrator may receive specifications or other application information and determine which cloud services and/or components are utilized by the received application. The decision process of how an application is distributed may utilize any number of processes and/or resources available to the orchestrator.

Often, each application has its own functional requirements: some work on particular operating systems, some operate as containers, some are ideally deployed as virtual machines, some follow the server-less operation paradigm, some utilize special networks to be crafted, and some may require novel cloud-native deployments. Today, it is common practice to distribute an application in one cloud environment that provides all of the application specifications. However, in many instances, application workloads may operate more efficiently on a plethora of (cloud) services from a variety of cloud environments. In other instances, an application specification may request a particular operating system or cloud environment when a different cloud environment may meet the demands of the application better. Providing flexibility in the deployment of an application in a cloud environment may improve the operation and function of distributed applications in the cloud.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

A system, network device, method, and computer readable storage medium is disclosed for deployment of a distributed application on a computing environment. The deployment may include deriving an environment solution model and environment descriptor including service components utilized for running underlying services of a computing environment, the service components related to an initial solution model for deploying the distributed application. The deployment may also include instantiating the plurality of service components of the computing environment comprises deriving an environment solution descriptor from a received environment solution model, the environment descriptor comprising a description of the plurality of service components utilized by the distributed application.

EXAMPLE EMBODIMENTS

Aspects of the present disclosure involve systems and methods to (a) model distributed applications for multi-cloud deployments, (b) derive, by way of policy, executable orchestrator descriptors, (c) model underlying (cloud) services (private, public, server-less and virtual-private) as distributed applications themselves, (d) dynamically create such cloud services if these are unavailable for the distributed application, (e) manage those resources equivalent to the way distributed applications are managed; and (f) present how these techniques are stackable. As applications may be built on top of cloud services, which themselves can be built on top of other cloud services (e.g., virtual private clouds on public cloud, etc.) even cloud services themselves may be considered applications in their own right, thus supporting putting cloud services on top of other cloud services. By instantiating services on top of services within the cloud computing environment, added flexibility in the distribution of applications within the cloud environment is achieved allowing for a more efficiently-run cloud.

Figure 1:
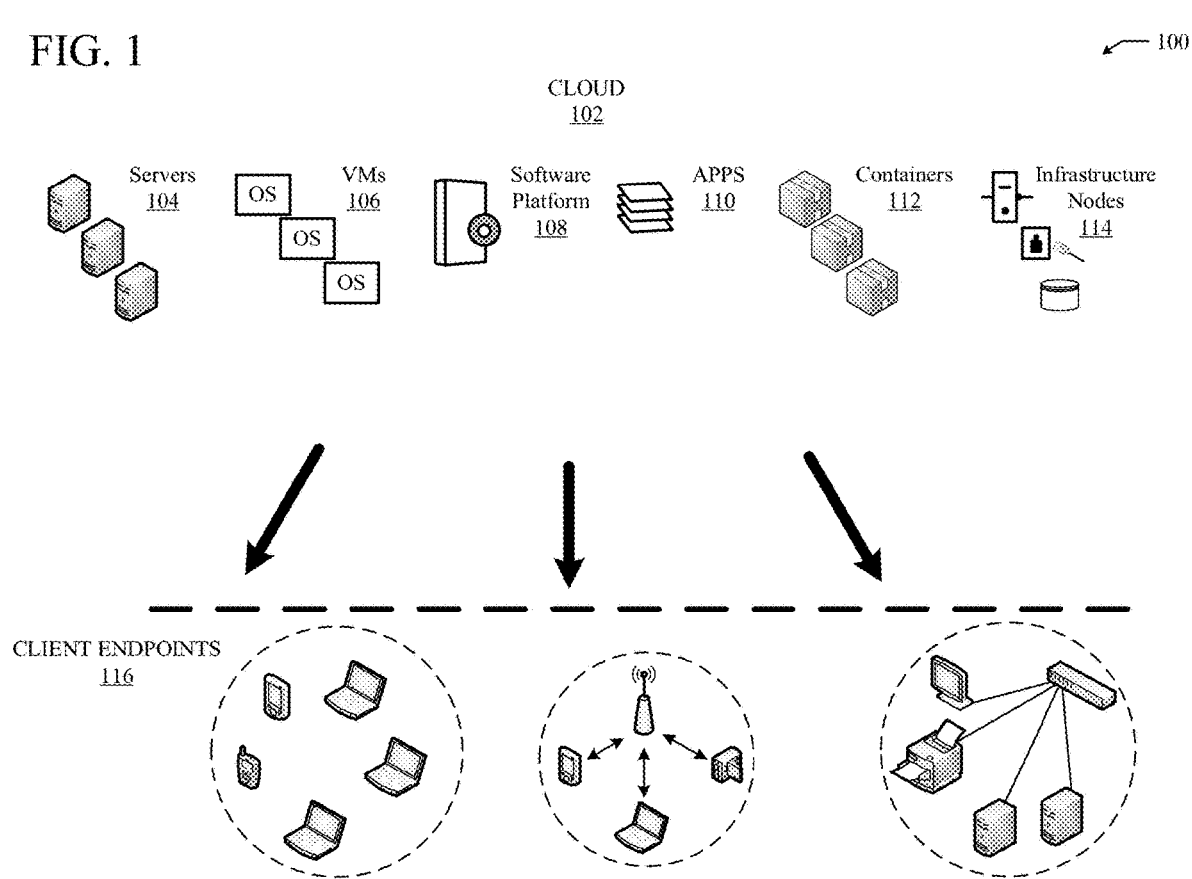
FIG. 1 is a system diagram of an example cloud computing architecture.

Beginning with the system of FIG. 1, a diagram of an example and general cloud computing architecture 100 is illustrated. In one particular embodiment, the architecture can include a cloud environment 102. The cloud environment 102 may include one or more private clouds, public clouds, and/or hybrid clouds. Moreover, the cloud environment 102 may include any number and type of cloud elements 104-114, such as servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud environment 102 may provide various cloud computing services via the cloud elements 104-114 to one or more client endpoints 116 of the cloud environment. For example, the cloud environment 102 may provide software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

Client endpoints 116 connect with the cloud environment 102 to obtain one or more specific services from the cloud environment 102. For example, the client endpoints 116 communicate with cloud elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a Global Positioning System (GPS) device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 2:
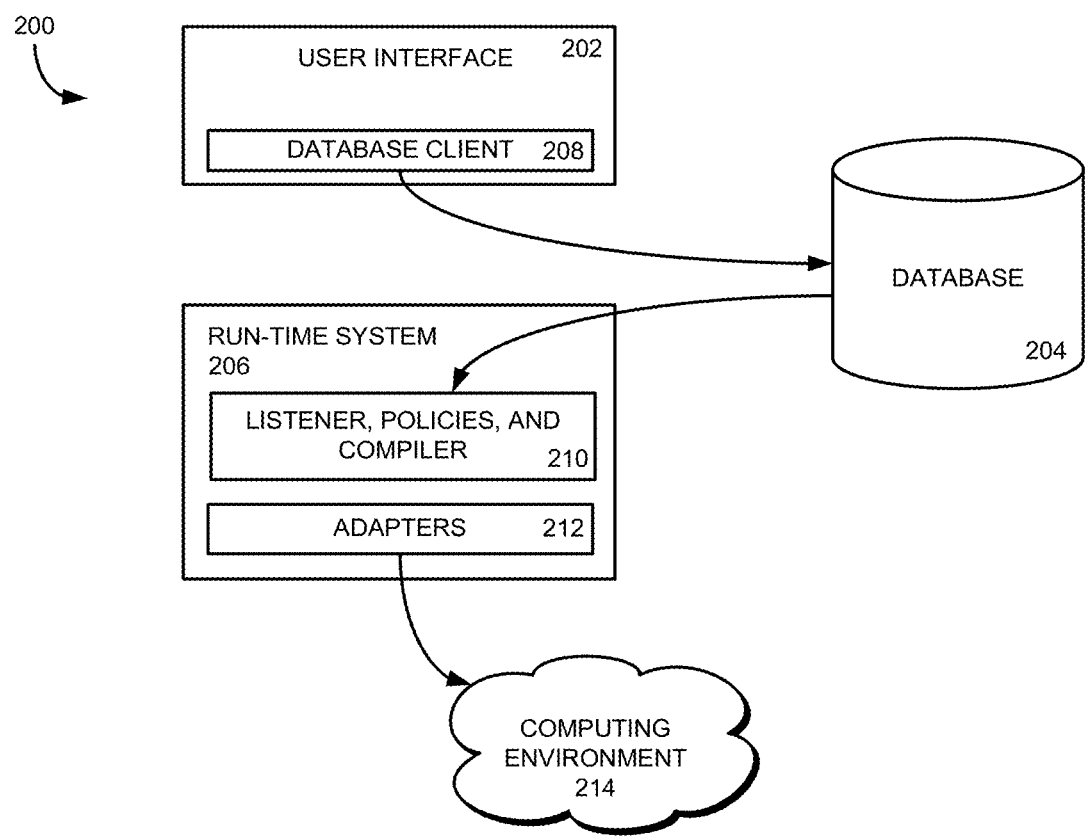
FIG. 2 is a system diagram for an orchestration system to deploy a distributed application on a computing environment.

To instantiate applications, services, virtual machines, and the like on the cloud environment 102, some environments may utilize an orchestration system to manage the deployment of such applications or services. For example, FIG. 2 is a system diagram for an orchestration system 200 for deploying a distributed application on a computing environment, such as a cloud environment 102 like that of FIG. 1. In general, the orchestrator system 200 automatically selects services, resources, and environments for deployment of an application based on a request received at the orchestrator. Once selected, the orchestrator system 200 may communicate with the cloud environment 102 to reserve one or more resources and deploy the application on the cloud.

In one implementation, the orchestrator system 200 may include a user interface 202, a orchestrator database 204, and a run-time application or run-time system 206. For example, a management system associated with an enterprise network or an administrator of the network may utilize a computing device to access the user interface 202. Through the user interface 202 information concerning one or more distributed applications or services may be received and/or displayed. For example, a network administrator may access the user interface 202 to provide specifications or other instructions to install or instantiate an application or service on the computing environment 214. The user interface 202 may also be used to post solution models describing distributed applications with the services (e.g., clouds and cloud-management systems) into the computing environment 214. The user interface 202 further may provide active application/service feedback by representing application state managed by the database.

The user interface 202 communicates with a orchestrator database 204 through a database client 208 executed by the user interface. In general, the orchestrator database 204 stores any number and kind of data utilized by the orchestrator system 200, such as service models, solution models, virtual function model, solution descriptors, and the like. In one embodiment, the orchestrator database 204 operates as a service bus between the various components of the orchestrator system 200 such that both the user interface 202 and the run-time system 206 are in communication with the orchestrator database 204 to both provide information and retrieve stored information.

Multi-cloud meta-orchestration systems (such as orchestrator system 200) may enable architects of distributed applications to model their applications by way of application's abstract elements or specifications. In general, an architect selects functional components from a library of available abstract elements, or function models, defines how these function models interact, and the infrastructure services, i.e., instantiated function models—functions—used to support the distributed application. A function model may include an Application Programming Interface (API), a reference to one or more instances of the function, and a description of the arguments of the instance. A function may be a container, virtual machine, a (bare-metal) appliance, a server-less function, cloud service, decomposed application and the like. The architect may thus craft an end-to-end distributed application comprised of a series of functional models and functions, the combination of which is referred to herein as a "solution model."

Operations in the orchestrator are generally intent- or promise-based such that models describe what should happen, not necessarily how "it" happens. This means that when an application architect defines the series of models describing the functional models of the application of the solution model, the orchestrator system 200 and its adapters 212 convert or instantiate the solution model into actions on the underlying (cloud and/or data-center) services. Thus, when a high-level solution model is posted into the orchestrator orchestrator database 204, the orchestrator listener, policies, and compiler component 210 (hereinafter referred to as "compiler") may first translate the solution model into a lower-level and executable solution descriptor—a series of data structures describing what occurs across a series of (cloud) services to realize the distributed application. It is the role of the compiler 210 to thus disambiguate the solution model into the model's descriptor.

Compilation of models into descriptors is generally policy based. This means that as models are being compiled, policies may influence the outcome of the compilation: networking parameters for the solution may be determined, policies may decide where to host a particular application (workload placement), what new or existing (cloud) services to fold into the solution and based on the particular state of the solution to deploy the solution in a harnessed test environment or as a live deployment as part of an application's life cycle. Moreover, when recompiling models (i.e., update models when these are activated), policies may use operational state of already existing models for fine-tuning orchestrator applications. Orchestrator policy management is a part of the life-cycle of distributed applications and drives the operations of the orchestrator systems 200 as a whole.

An operator of orchestrator can activate a solution descriptor. When doing so, functional models as described by their descriptors are activated onto the underlying functions (i.e., cloud services) and adapters 212 translate the descriptor into actions on physical or virtual cloud services. Service types, by their function, are linked to the orchestrator system 200 by way of an adapter 212 or adapter model. In this manner, adapter models (also referred to herein as "adapters") may be compiled in a similar manner as described above for solution models. As an example, to start a generic program bar on a specific cloud, say, the foo cloud, the foo adapter 212 or adapter model takes what is written in the descriptor citing foo and translates the descriptor towards the foo API. As another example, if a program bar is a multi-cloud application, say, a foo and bletch cloud, both foo and bletch adapters 212 are used to deploy the application onto both clouds.

Adapters 212 also play a role in adapting deployed applications from one state to the next. As models for active descriptors are recompiled, it is up to the adapters 212 to morph the application space to the expected next state. This may include restarting application components, cancelling components altogether, or starting new versions of existing applications components. In other words, the descriptor describes the desired end-state which activates the adapters 212 to adapt service deployments to this state, as per intent-based operations.

An adapter 212 for a cloud service may also posts information back into the orchestrator orchestrator database 204 for use by the orchestrator system 200. In particular, the orchestrator system 200 can use this information in the orchestrator database 204 in a feedback loop and/or graphically represent the state of the orchestrator managed application. Such feedback may include CPU usage, memory usage, bandwidth usage, allocation to physical elements, latency and, if known, application-specific performance details. This feedback is captured in service records. Records may also be cited in the solution descriptors for correlation purposes. The orchestrator system 200 may then use record information to dynamically update the deployed application in case it does not meet the required performance objectives.

In one particular embodiment of the orchestrator system 200 discussed in greater detail below, the orchestrator may deploy (cloud) services just like the deployment of distributed applications: i.e., (cloud) services are just as much an application of an underlying substrate relative to what is traditionally called application space. As such, this disclosure describes dynamic instantiation and management of distributed applications on underlying cloud services with private, public, server-less and virtual-private cloud infrastructures and the dynamic instantiation and management of distributed (cloud) services. In some instances, the orchestrator system 200 manages cloud services as applications themselves and, in some instances, such a cloud service itself may use another underlying cloud service, that underlying cloud service, again, is modeled and managed like an orchestrator application. This provides a stack of (cloud) services that, when joined with the distributed application itself, culminates in an end-to-end application of services stacked on services within the computing environment 214.

For example, assume one or more distributed applications utilize a foo cloud system and are activated in orchestrator system 200. Further, assume there are no foo cloud services available or there are insufficient resources available to run the application on any of the available foo clouds. In such an instance, the orchestrator system 200 may dynamically create or expand a foo cloud service by way of (public or private) bare-metal services, on top of a virtual-private cloud. If such a foo cloud service then utilizes a virtual-private cloud system, the virtual-private cloud system may be modeled as an application and managed akin to the foo cloud and the original orchestrator application that started it all. Similarly, if the orchestrator system 200 finds that too many resources are allocated to foo, it may make an underlying bare-metal service contract.

Described below is a detailed description of aspects of the orchestrator system 200 to support the described disclosure. In one particular example described throughout, an application named bar is deployed on a single, dynamically instantiated foo cloud to highlight the data actors in orchestrator system 200 and the data structures used by orchestrator for its operations. Also described are how (cloud) services may be dynamically created, how multi-cloud deployments operate, and how life-cycle management may be performed in the orchestrator system 200.

Figure 3:
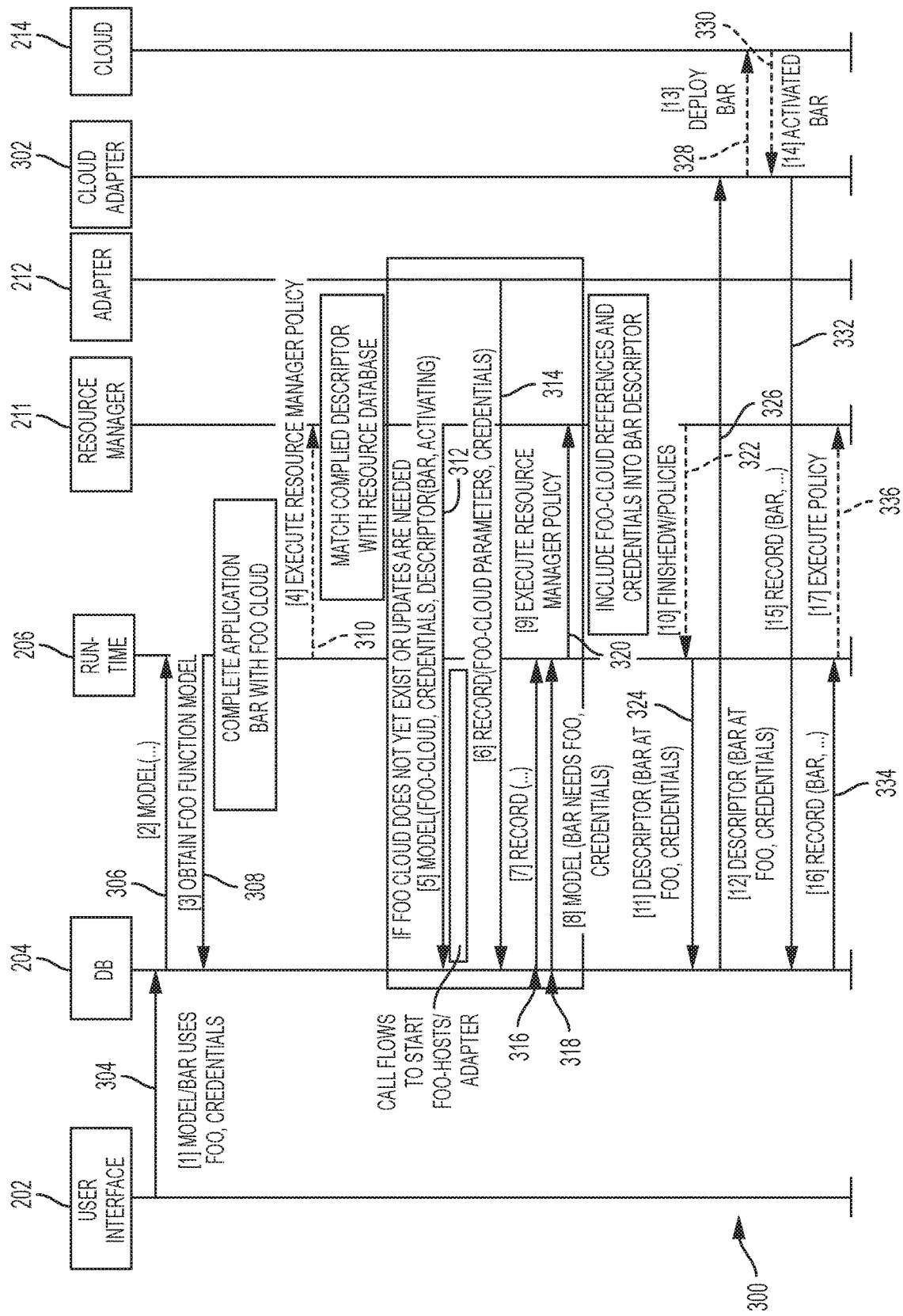
FIG. 3 is a diagram illustrating an initiation of a distributed application by way of an orchestrator to a cloud computing environment.

Turning now to FIG. 3, a dataflow diagram 300 is shown illustrating an initiation of an application named bar by way of an orchestrator system 200 of a cloud computing environment. The main components in use in the diagram include:

User interface 202 to provide a user interface for an operator of the orchestrator system 200.
    A orchestrator database 204 acting as a message bus for models, descriptors and records.
    The run-time system 206 including of a compiler that translates solution models into descriptors. As part of the run-time system, policies may augment a compilation. Policies can address resource management functions, workload and cloud placement functions, network provisioning and more. These are typically implemented as in-line functions to the run-time system and as a model is compiled, drive the compilation towards a particular deployment descriptor.

Adapters 212 that adapt descriptors to underlying functions (and thus cloud services). In general, the adapters may be manageable applications in their own right. In some instances, adapters 212 are a portion of the run-time system 206 or may be separate.

Exemplary, a foo cloud adapter 302 and foo cloud environment that are dynamically created as a function offering a service.

In general, the orchestrator systems 200 may maintain three main data structures: solution models, solution descriptors, and service records. Solution models (or models in short) are used to describe how applications hang together, what functional models are utilized, and what underlying services (i.e. functions) are used. Once a model is compiled into a solution descriptor (or descriptor), the descriptor is posted in the orchestrator orchestrator database 204. While models may support ambiguous relationships, no ambiguities are generally included in descriptors—these descriptors are "executable" by way of the adapters 212 and underlying cloud services. Disambiguation is generally performed by the run-time system 206. Once an adapter 212 is notified of the availability of a new descriptor, the adapter picks up the descriptor, adapts the descriptor to the underlying cloud service, and realizes the application by starting (or changing/stopping) application parts.

The main data structures of the orchestrator system 200 (model, descriptors and records) maintain the complex application and service state. For this, data structures may refer to each other. A solution model maintains the high-level application structure. Compiled instances of such models, known as descriptors, point to the model these are derived from. When descriptors are active, in addition, one or more service records are created. Such service records are created by the respective orchestrator adapters 212, and include references to the descriptors on which these depend.

Figure 4:
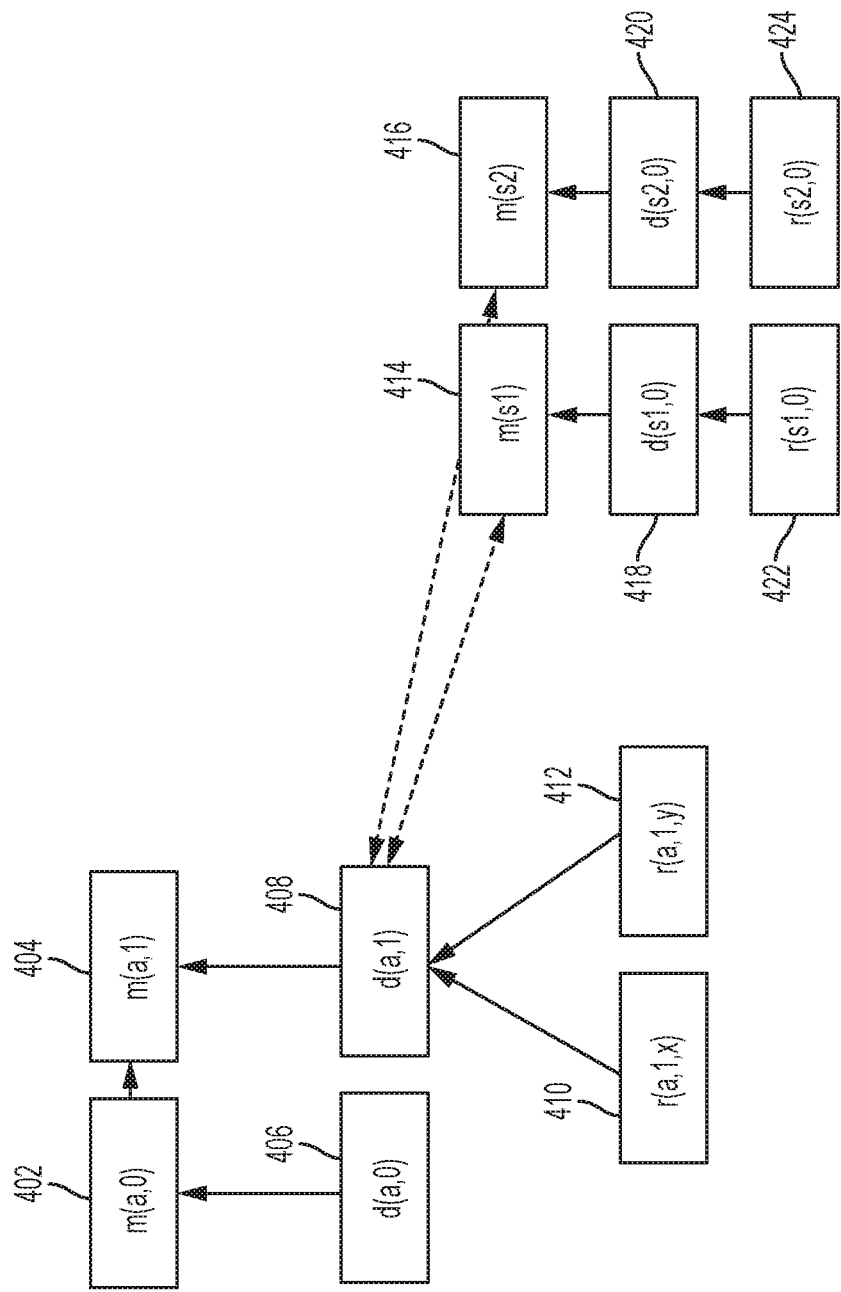
FIG. 4 is a diagram illustrating dependencies between data structures of a distributed application in a cloud computing environment.

In case an active descriptor is built on top of another dynamically instantiated (cloud) service, that underlying service is activated by way of its model and descriptor. Those dependencies are recorded in both the application descriptor and the dynamically created (cloud) services. FIG. 4 presents a graphical representation of these dependencies. For example, m(a,0) 402 and m(a,1) 404 of FIG. 4 are the two models for application A, d(a, 0) 406 and d(a, 1) 408 represent two descriptors depending on the models, and r(a, 1, x) 410 and r(a, 1, y) 412 represent two records listing application states for d(a,1). Models m(a,1) 404 and m(a,0) 402 are interdependent in that these are the same models, except that different deployment policies are applied to them. When a descriptor is deployed over a (cloud) service that is resident, that resident service's adapter simply posts data in a record without being described by a model and descriptor.

In the example illustrated, two dynamic (cloud) services are created as models: m(s1) 414 and m(s2) 416. Both these are compiled and deployed and described by their data structures. By keeping references between models and descriptors, the run-time system may (1) find dependencies between deployments of applications and services, (2) make this information available for graphical representation and (3) clean up resources when needed. For instance, if d(a,1) 408 is cancelled, the orchestrator system 200 may deduce that d(s1,0) 418 and d(s2,0) 420 are not used by any application anymore and decide to discard both deployments.

The orchestrator system 200 compiler can host a series of policies that help the compiler compile models into descriptors. As shown in FIG. 4, d(a,0) 406 and d(a,1) 408 both refer to, in essence, the same model and these different descriptors may be created when different policies are applied—for instance, d(a,0) may refer to a deployment with public cloud resources, while d(a,1) may refer to a virtual-private cloud deployment. In this latter case, m(s1) 414 may then refer to a model depicting a virtual-private cloud on top of, say, a public cloud environment, associated with all the virtual-private network parameters, while m(s2) 416 refers to locally held and dynamically created virtual-private cloud on private data-center resources. Such policies are typically implemented as in-line functions to the compiler and the names of such policies are cited in the solution models that need to be compiled.

Referring again to FIG. 3, a deployment of an application, noted as bar, is started on cloud foo. Starting in step [1] 304, a user submits a request to execute application bar by submitting the model into the orchestrator system 200 through the user interface 202. This application, as described by way of the model, requests a foo cloud to run and to be run for the subscriber defined by the model credentials. This message is posted to the orchestrator orchestrator database 204, and percolates to those entities listening for updates in the models database. In step [2] 306, the run-time system 206 learns of the request to start application bar. Since bar requests cloud environment foo, the compiler 210 pulls the definition of the function model foo from the function model database (step [3] 308) and furthers compilation of the solution model into a solution descriptor for application bar.

As part of the compilation, the resource manager policy is activated in step [4] 310. When the resource manager policy finds that foo cloud does not exist, or does not exist in the appropriate form (e.g., not for the appropriate user as per the credentials) while compiling the solution model for bar, in step [5] 312 the resource manager 211 deposits into the orchestrator database 204 a model describing what type of foo cloud is desired and suspends compilation of the application bar with a partially compiled descriptor stored stating "activating". The creation of the foo cloud and adapter is described in more detail below. As shown in step [6] 314, once foo cloud exists, and run-time system 206 is made aware of this (step [7] 316), the run-time system 206 pulls the bar model again (step [8] 318) and the resource manager 211 (re-)starts the compilation (step [9] 320). When the application bar is compiled (step [10] 322), the descriptor is posted into the orchestrator database 204 (step [11] 324) and can now be deployed.

In step [12] 326, the foo cloud adapter 302 picks up the descriptor from the orchestrator database 204 and in step [13] 328 deploys the application onto the foo cloud and in step [14] 330 an indication of the activation of the application is received at the cloud adapter. In step [15] 332, the start operation is recorded in a service record of the orchestrator database 204. As the application proceeds, the foo cloud adapter 302 posts other important facts about the application into the orchestrator database 204 (steps [15-17]) 332-336 and beyond.

Figure 5:
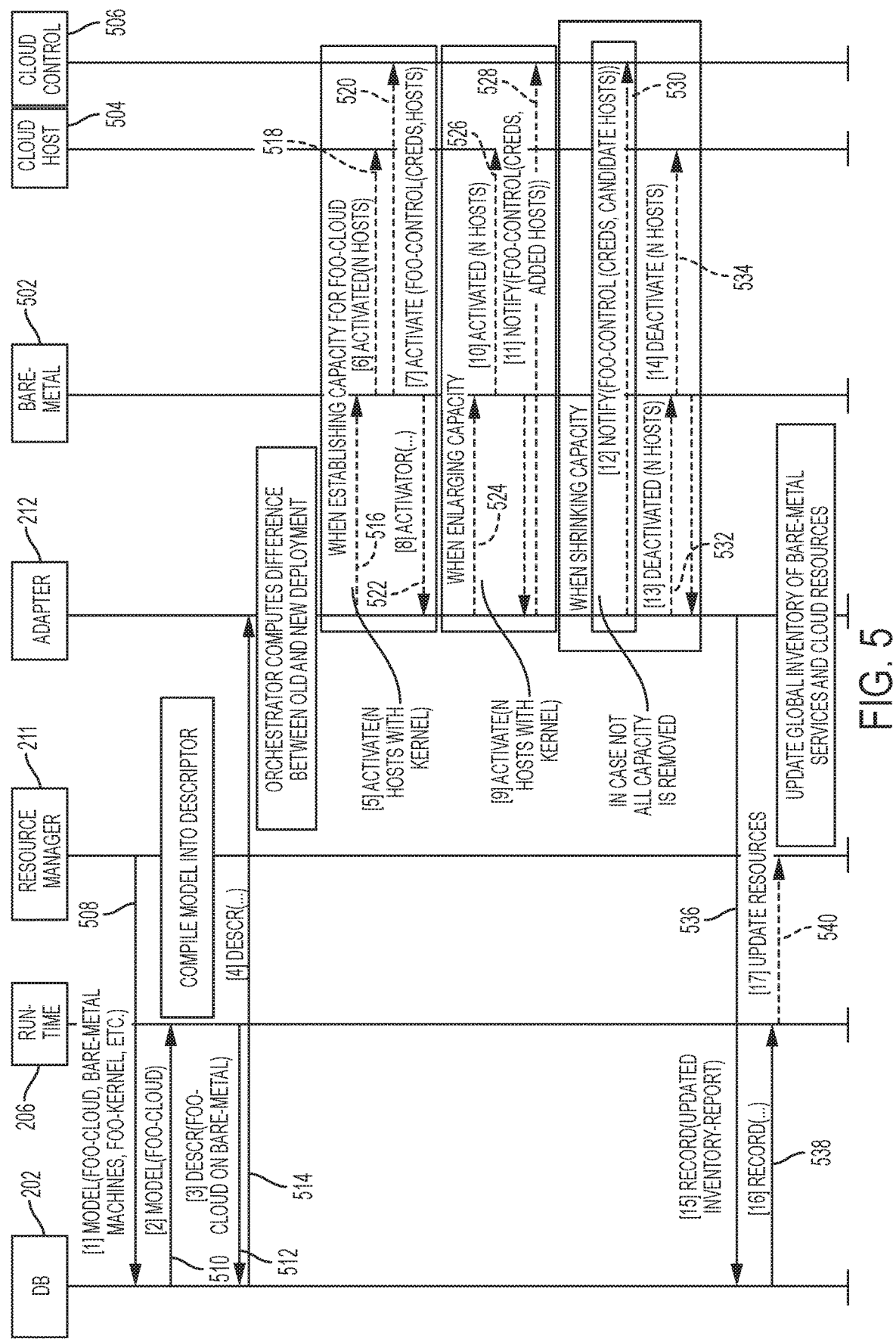
FIG. 5 is a diagram illustrating creating a cloud service to instantiate a distributed application in a cloud computing environment.
Figure 6:
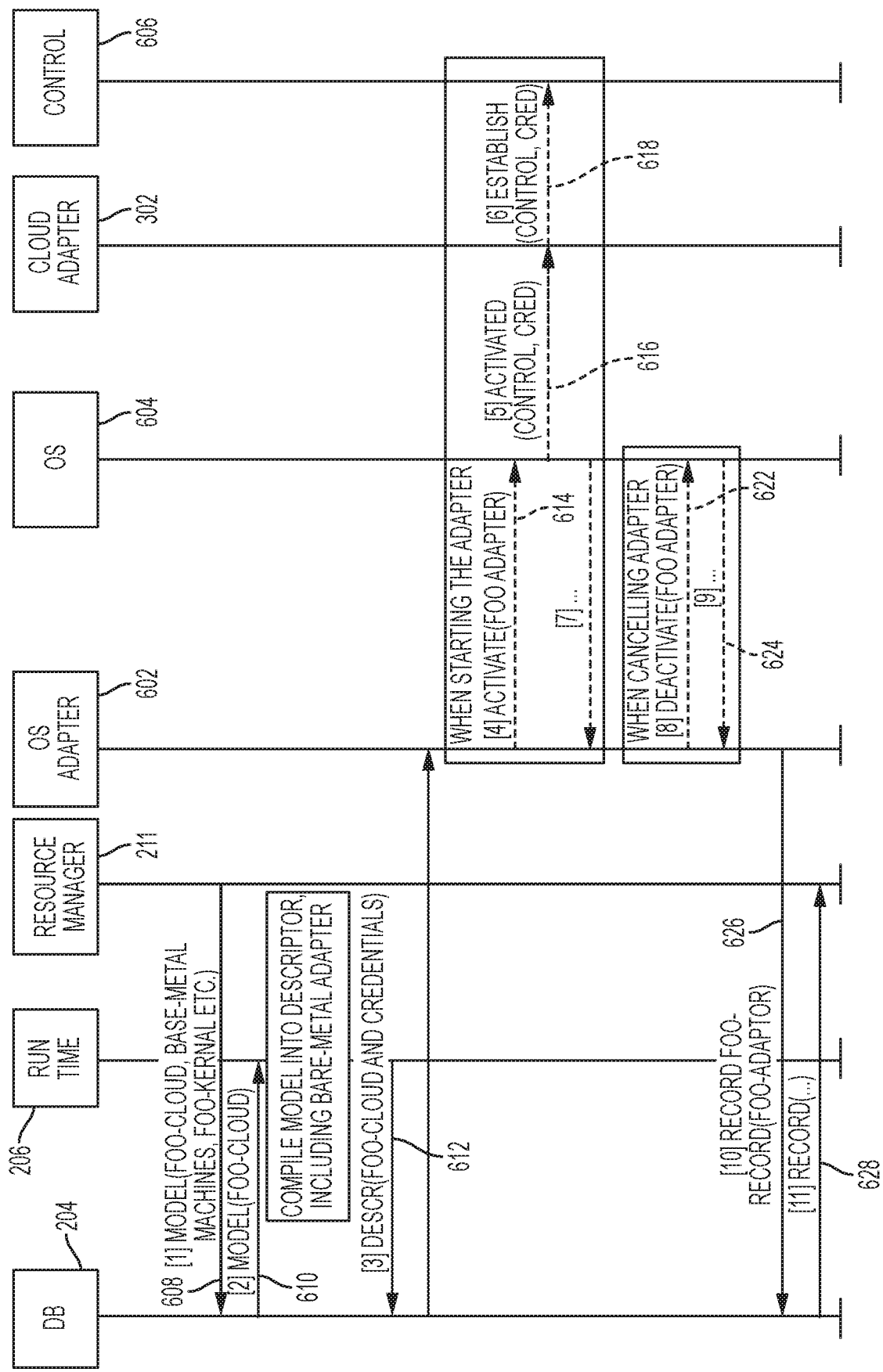
FIG. 6 is a diagram illustrating creating a cloud adapter to instantiate a distributed application in a cloud computing environment.

Referring now to FIG. 5 and FIG. 6, it is shown respectively how foo cloud and the foo cloud adapters can be created to support application bar. In other words, foo cloud and the cloud adapters may themselves be instantiated as applications by the orchestrator onto which the application bar may be deployed. Here, as an example, foo cloud is comprised of a series of hyper-visor kernels, but it goes that other types of deployments (containers, server-less infrastructures, etc.) may be equally possible, albeit with different modeling. Referring again to FIG. 3 (and particularly of step [5] 312), when application bar indicates it calls a foo cloud, the resource manager 211 posts into the orchestrator database 204 a message. As illustrated in FIG. 5 as step [1] 508, a model depicting the type of cloud requested for application bar is stored. In this case, the application may request N foo-kernels on bare-metal. Thus, the application may request a foo controller on one of the N kernels and a foo adapter on Kubernetes. In response to this storing, the run-time system 206 may be notified of the desire to start a foo cloud in step [2] 510.

Assuming foo cloud utilizes a private network to operate (e.g., a Virtual Local Area Network (VLAN), private Internet Protocol (IP) address space, domain name server, etc.), all such network configuration may be folded into the foo cloud descriptor while compiling the foo cloud model. IP and networking parameters can either be supplied by way of the foo cloud model, or can be generated when the foo cloud model is compiled by way of included compiler policies.

The compiler 210 compiles the foo cloud model into the associated foo cloud descriptor and posts this descriptor into the orchestrator orchestrator database 204 (step [3] 312). For this example, the compiler 210, and integrated resource manager, opted to host the foo cloud service on bare-metal cluster X 502, which served by the adapter 212. Here, the adapter 212 may be responsible for managing bare-metal machinery 502. Since the adapter 212 is referred to by way of the descriptor, the adapter wakes up when a new descriptor referring to it is posted in step [4] 514 and computes the difference between the requested amount of resources and the resources it is already managing (if any). Three potential instances are illustrated in FIG. 5, namely: capacity is to be created afresh, existing capacity is to be enlarged, or existing capacity is to be shrunk based on the retrieved descriptor.

When establishing or enlarging capacity, the bare-metal infrastructure 502 is prepared to host a foo kernel and the associated kernels are booted through the adapter 212 (step [5] 516, step [6] 518, step [9] 524, and step [10] 526). Then, optionally, in steps [7] 520, a controller 506 for foo cloud is created and the adapter 212 is notified of the successful creation of the foo hosts and associated controller in step [8] 522. When enlarging capacity, in step [11] 528 an existing foo controller 506 is notified of new capacity. When shrinking capacity, in step [12] 530 the controller 506 is notified of the desire to shrink capacity and given an opportunity to re-organize hosting, and in steps [13,14] 532, 534, the capacity is reduced by deactivating hosts 504. When all hosts 504 are activated/deactivated, the adapter 212 posts this event into the orchestrator database 204 by way of a record. The record finds its way into the run-time system 206 and compiler, which update the resource manager 211 of the started cloud (steps [15,16,17] 536-540).

FIG. 6 shows the creation of the foo adapter as per the foo model. As before, the resource manager 211 posts the foo model into the orchestrator database 204 (step [1] 608), the run-time system 206 is notified of the new model (step [2] 610), compiles the model, and generates a reference to a foo adapter 212 that needs to be hosted on Kubernetes through the foo cloud descriptor. Assuming Kubernetes is already active (either created dynamically or statically), the resident Kubernetes adapter 602 picks up the freshly created descriptor, and deploys the foo adapter as a container in a pod on a Kubernetes node. The request carries appropriate credentials to link the foo adapter 302 with its controller 606 (steps [4,5,6,7] 614-620). In steps [8,9] 622-624 of FIG. 6, the foo adapter 302 is undone by posting a descriptor informing the Kubernetes adapter 602 to deactivate the foo adapter. In steps [10,11] 626-628, a record for the creation of the foo adapter 302 is posted in orchestrator database 204, which can trigger operations in the resource manager 211 to resume compilation as depicted above in FIG. 3.

Through the operations described above, the cloud adapters and other cloud services are instantiated on the cloud environment as applications themselves. In other words, the orchestrator system 200 may deploy various aspects of the cloud environment as distributed applications. In this manner, applications may utilize services of the cloud environment that are themselves applications. Further, those services may depend on other cloud services, which may also be instantiated as a distributed application by the orchestrator system 200. By stacking services upon services within a cloud environment, the orchestrator system 200 is provided with flexibility in selecting and deploying applications onto bare-metal resources of the environment. For example, an application request that includes a particular operating system or environment may be instantiated on a bare-metal resource that is not necessarily dedicated to that operating environment. Rather, aspects of the environment may first be deployed as applications to create the particularly requested service on the resource and the distributed application may then utilize those services as included in the request. Through the instantiation of services as applications by the orchestrator system 200 that may then be utilized or depended upon by the requested application, more flexibility for distribution of all applications by the orchestrator system 200 is gained on any number and type of physical resources of the cloud environment.

Figure 7:
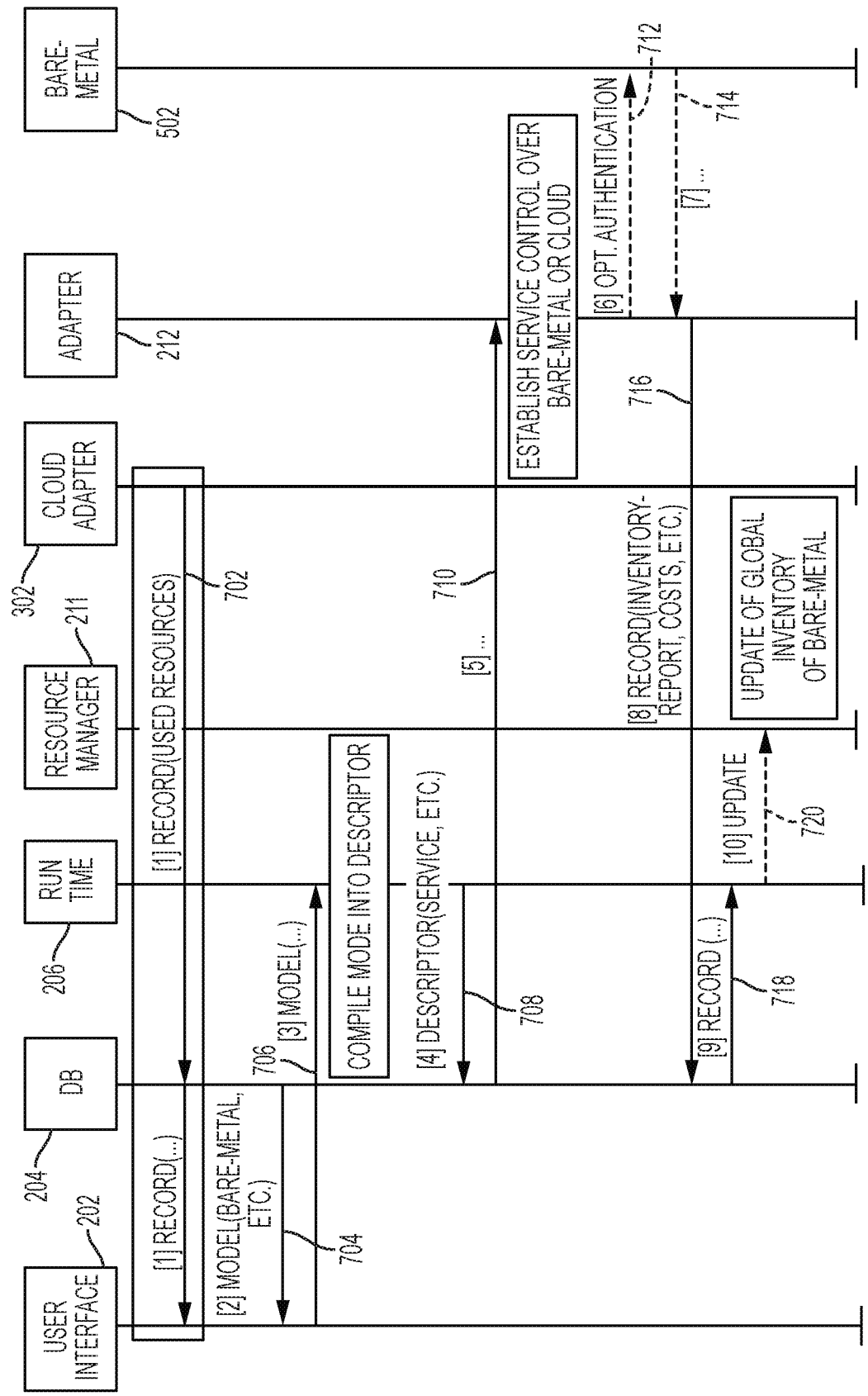
FIG. 7 is a diagram illustrating changing the capacity of an underlying cloud resource in a cloud computing environment.

Continuing to FIG. 7, operations for on-boarding or changing the capacity of underlying (cloud) resources is illustrated. First in step [1] 702, optionally as applications such as bar are active, the foo adapter 302 finds that more capacity is needed for the application. For this it may post a record identifying the need for more resources into the orchestrator database 204. The user interface 202 may then pick up the request and query the operator for such resources.

On-boarding of resources proceeds by way of models, descriptors and records from the orchestrator database 204 as depicted by step [2] 704 of FIG. 7. In this step, a model is posted describing the requested resources, credentials for the selected bare metal/cloud services, and the amount of resources needed. The run-time system 206 compiles the model into its descriptor and posts this into the orchestrator database 204 in step [4] 708. In step [5] 710, the cited adapter 212 picks up the descriptor and interfaces with the bare-metal/cloud service 502 itself to on-board bare metal functions in step [6] 712 and step [7] 714. In steps [8, 9, 10] 716-720, the new capacity of underlying resources finds its way to the resource manager 211 through orchestrator database 204.

Figure 8:
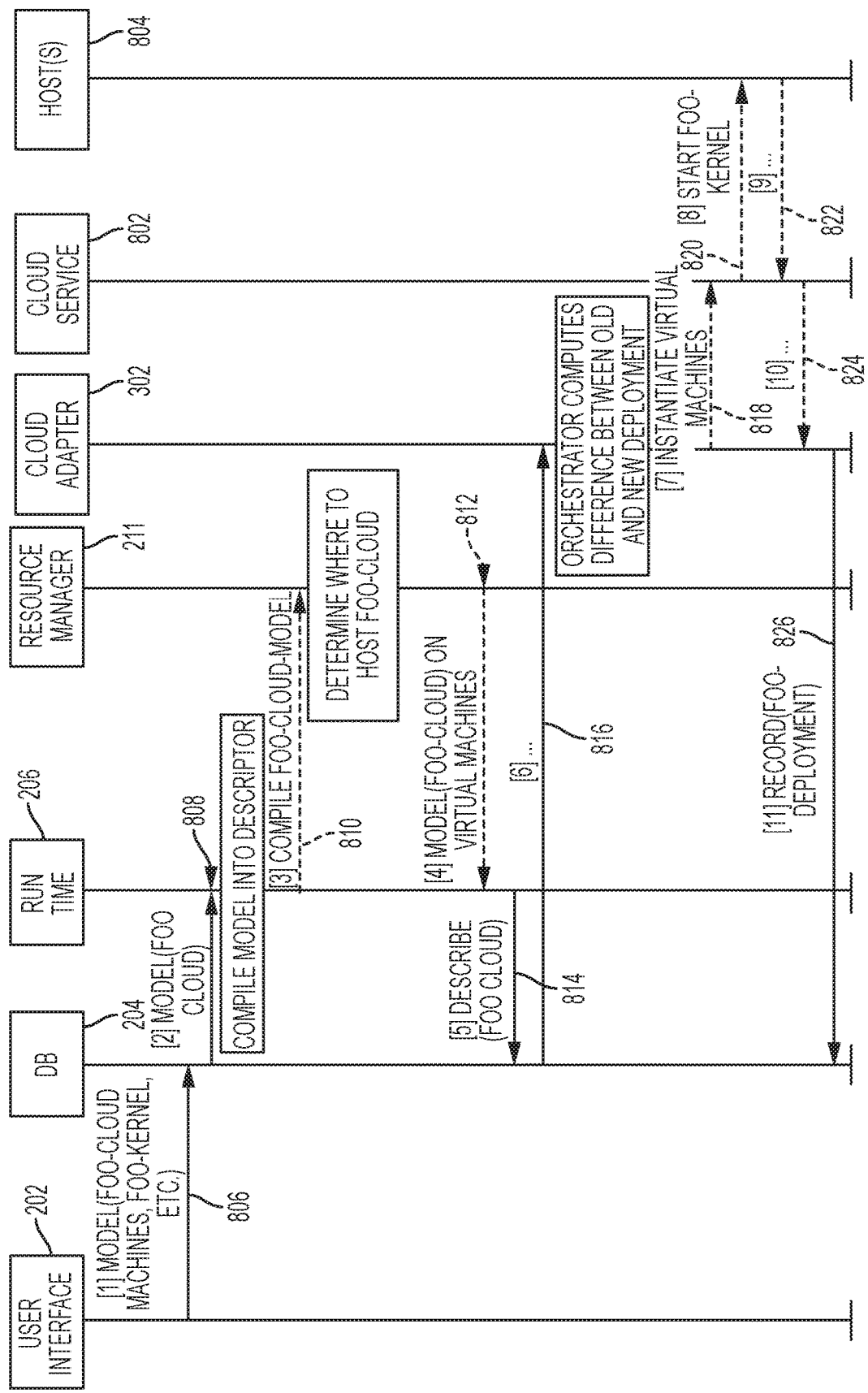
FIG. 8 is a diagram illustrating making dynamic deployment decisions to host applications on a computing environment.

FIG. 8 describes the orchestrator system 200 making dynamic deployment decisions to host applications, such as bar, onto cloud services with functionality, such as Virtual-Private Clouds (VPCs). In one implementation, virtual-private networks may be established between a (remote) private cloud hosted on public cloud providers, potentially extended with firewall and intrusion detection systems and connected to a locally held private cloud operating in the same IP address space. Similar to above, such deployments may be captured through a model, which is dynamically integrated into the model for bar as a more comprehensive model during compilation.

Beginning in step [1] 806, by way of the user interface 202, a model is posted into the orchestrator database 204 that leaves open how to execute bar and refers to both bare-metal and virtual-private cloud deployments as possible deployment models. The run-time system 206 may access the model from the orchestrator database 204 in step [2] 808. When in step [3] 810 the model is compiled into a descriptor, the resource manager 211 dynamically decides how to deploy the service and in this case, when it opts for hosting bar through a VPC, the resource manager folds in the descriptor a firewall, a VPN service and a private network for bar.

As before, and shown in step [6] thru [11] 816-826, the newly crafted VPC-based bar application is operated just like any other application. In step [8] 820, for example, the firewall and VPN service is created as applications deployed by the orchestrator.

Figure 9:
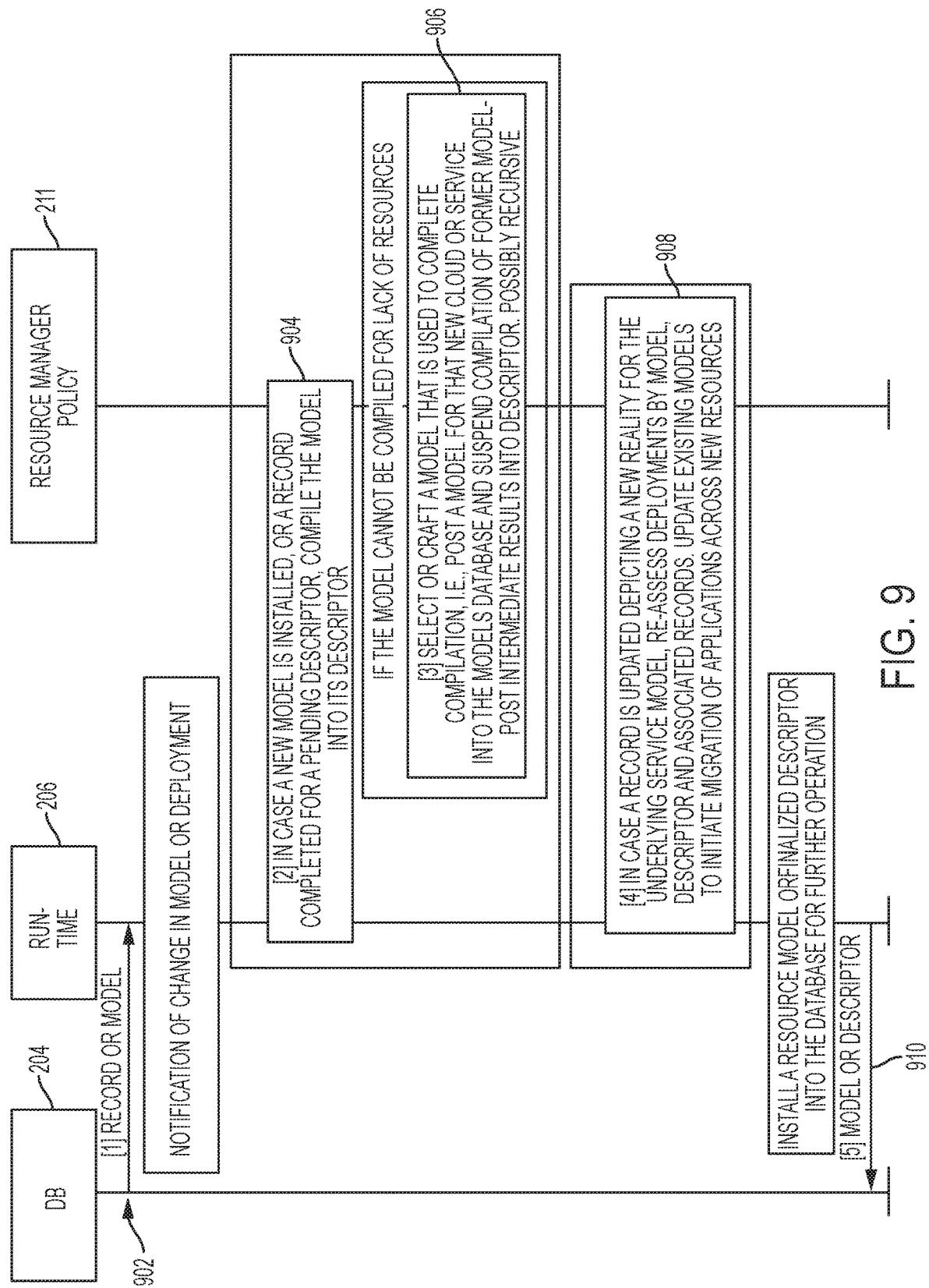
FIG. 9 is a diagram illustrating main operations of an orchestrator in stacking services in a computing environment.

FIG. 9 shows the main operations of the orchestrator system 200 and how it stacks (cloud) services. While the descriptions above demonstrate how application bar is deployed across a bare-metal service and a virtual-private cloud deployment, such deployments may follow the main features of the orchestrator state machine as depicted in FIG. 9. The orchestrator system 200 may include two components, the run-time system 206 and its associated resource manager 211. The run-time system 206 is activated when records or models are posted in orchestrator database 204. These are generally two events that change the state of any of its deployments: records are posted by adapters whenever cloud resources change, and models are posted when applications need to be started/stopped or when new resources are on-boarded.

The illustrated data flow relates to those events that are part of a compilation event for a model. The model is first posted in the orchestrator database 204, and picked up by the run-time system 206 in step [1] 902. In case a model can be compiled directly into its underlying descriptor in step [2] 904, the descriptor is posted in step [5] 910 back into the orchestrator database 204. In some instances, the model cannot be compiled because of the absence of a specific service or lack of resources in a particular cloud or service. In such instances, step [3] 906 addresses the case where a new (underlying) service is to be created. Here, first a descriptor is for the original model is posted back into the orchestrator database 204 indicating a pending activation state. Next, the resource manager 211 creates a model for the required underlying service and posts this model into the orchestrator database 204. This posting triggers the compilation and possible creation of the underlying service. Similarly, in case more resources are utilized for an existing underlying service, the resource manager 211 simply updates the model associated with the service and again suspends the compilation of the model at hand. In some instances, steps [1,2,3,5] can be recursive to build services on top of other services. As lower level services become available, such availability is posted in service records, which triggers resumption of the compilation of the suspended model.

During operation of the distributed application, services may become unavailable, too expensive, fail to start, or otherwise become unresponsive. In such cases, step [4] 908 provides a mechanism to abort compilations, or to rework application deployments. The former occurs when finding initial deployment solutions, the latter occurs for dynamically adjusting the deployment with other deployment opportunities. The resource manager 211, in such cases, updates the involved solution models and requests run-time system 206 to recompile the associated models. It is expected in such cases that the resource manager 211 maintains state about the availability of resources for subsequent compilations of the applications.

The descriptions included above are generally centered around cases where only a single (cloud) service is used for setting up applications. Yet, the orchestrator system 200 is not limited to hosting an application on one cloud environment only. Rather, in some instances, a distributed application may to be hosted on a multi-type, multi-cloud environment. The orchestrator system 200 may orchestrate the application across such (cloud) services, even when these (cloud) services are to be created and managed as applications themselves. During the compilation and resource management phase, the orchestrator system 200 determines where to best host what part of the distributed application and dynamically crafts a network solution between those disjoint parts. When a multi-cloud application is deployed, one part may run on a private virtual cloud on a private data center, while other parts run remotely on a public bare-metal service, and yet, by laying out a virtual-private network, all application parts are still operating in one system.

Through the use of stacked applications as services in a cloud environment, such services attain a more robust availability and reliability during failures of cloud resources. For example, by synchronizing application state through the orchestrator and the data structures as shown in FIG. 4, periodically, the run-time system 206 tests if the parts of the system remain responsive. For this, the orchestrator system 200 periodically and automatically updates stored models. This update leads to a recompiling of the associated descriptors, and whenever descriptors are updated, the adapters are triggered to re-read these descriptors. The adapters compare the new state with deployed state, and acknowledge the update by way of their adapters in service records. This allows for the run-time system 206 to, shortly after posting new version of models, expect updated records.

In the instance where failures occur (e.g., network partitions, adapter failures, controller failures), an update of the model may lead to a missed update of the associated record. If this persists across a number of model updates, the system part associated with the unresponsive record is said to be in an error state. Subsequently, it is pruned from the resource manager's list of (cloud) services, and applications (or services) referencing the failed component are redeployed. This is simply triggered (again) by an update of the model, but now, when the resource manager 211 is activated, the failed component is not considered for deployment.

In case the run-time system 206 is unavailable (network partition) or has failed, no updates are posted into the solution model. This is an indication to each of the adapters that the system is executed uncontrolled. It is the responsibility of the adapters to dismantle all operations when a timer pre-set expires. This timer is established to allow the run-time system 206 to recover from a failure or its unavailability. Note that this procedure may also be used for dynamic upgrades of the orchestrator system 200 itself. In case an adapter or all of the adapters fail to communicate with the orchestrator database 204, it is the responsibility of the adapters to gracefully shutdown the applications they manage. During a network partition of the adapter and the run-time system 206, the run-time system updates the resource manager state and recompiles the affected applications.

In another advantage, the orchestrator system 200 attains a life-cycle management of distributed applications and underlying services. The steps involved in application lifecycle management may involve, planning, developing, testing, deploying and maintaining applications.

When developing distributed applications and underlying services, such applications and services likely use many testing and integration iterations. Since the orchestrator enables easy deployment and cancelation of distributed deployments with a set of (cloud) services, the development phase involves defining the appropriate application models for the distributed application and the deployment of such application.

Once development of the distributed application finishes, testing of the distributed application commences. During this phase, a model of a real system is built, with real application data simulating a real-world deployment. In this phase (test) networks are laid out, (test) cloud infrastructures are deployed and simulated (customer) data is utilized for acceptance and deployment testing. The orchestrator supports this step of the process by allowing full application models to be built and deployed, yet, by applying the appropriate policies, testers have the ability to craft a test harness that copies a real deployment. Again, such test deployments can be dynamically created and torn down.

The deployment phase is a natural step from the testing phase. Assuming that the only difference between the test deployment and the real deployment is the test harness, all that needs to be done is apply a different deployment policy onto the application models to roll out the service. It goes that since deployments are policy driven, specific deployments can be defined for certain geographies. This means that if a service is only to be supported in one region, resource manager policy selects the appropriate (cloud) services and associated networks.

The maintenance phase for distributed applications is also managed by the orchestrator. In general, since operations in the orchestrator are model and intent driven, updating applications, application parts or underlying cloud services involve, from an orchestrator perspective, only the relevant models are updated. So, as an example, if there is a new version of application bar that needs to subsume an existing (and active) application bar, a new model is installed in the database referring to the new bar and the orchestrator is notified to "upgrade" the existing deployment with the new application bar—i.e., there is the intention to replace existing deployments of bar. In such cases, adapters have a special role—they adapt the intention to reality and, in the case of the example, replace the existing applications of bar with the new version by comparing the new descriptor with the old descriptor and taking the appropriate steps to bring the deployment (as recorded in the records) in line with the new descriptor. In case an upgrade is not successful, reverting to an older version of application simply involves reverting back the old model; the adapter adapts the application again.

In some cases, applications are built using dynamically deployed services. As shown in FIG. 4, the orchestrator system 200 maintains in descriptors and models the dependencies between applications and services on which these applications are built. Thus, when a service is replaced by a new version, dependent descriptors may be restarted. The orchestrator system 200 performs this operation by first deactivating all dependent descriptors (recursively), before redeploying these applications (and possibly) services on the newly installed service.

In general, the orchestrator system 200 bootstrap process can be modeled and automated as well. Since cloud services can be dynamically created and managed, all that is used for bootstrapping the orchestrator itself is an infrastructure adapter, and a simple database holding a descriptor that describes the base layout of the system that needs to be built. As an example, and assuming the orchestrator is to run inside a Kubernetes environment, the descriptor may describe the APIs to a bare-metal service, the specific configuration for the Kubernetes infrastructure on top of the bare-metal machines and what base containers to get started inside one or more pods. These containers may be used to run the database and the run-time system.

Figure 10:
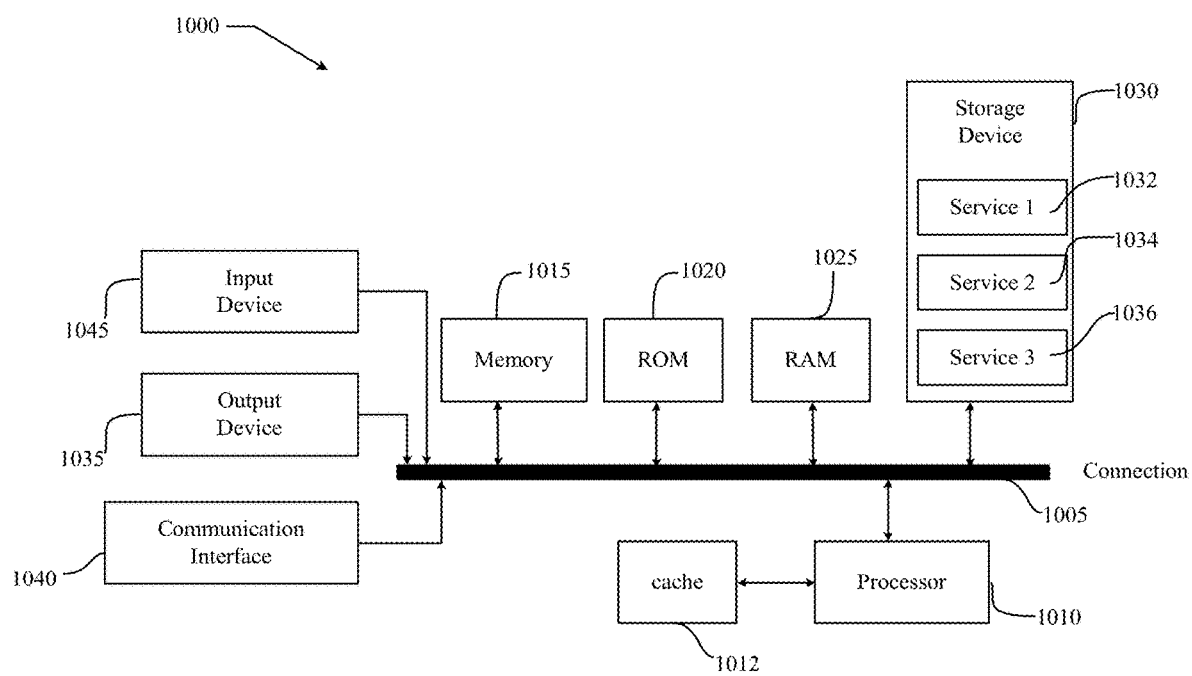
FIG. 10 shows an example system embodiment.

FIG. 10 shows an example of computing system 1000 in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple datacenters, a peer network, etc. In some embodiments, one or more of the described system components represents many such components, each performing some or all of the function for which the component is described. In some embodiments, the components can be physical or virtual devices.

Example system 1000 includes at least one processing unit (CPU or processor) 1010 and connection 1005 that couples various system components, including system memory 1015, such as read only memory (ROM) 1020 and random access memory (RAM) 1025, to processor 1010. Computing system 1000 can include a cache of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a portable device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, Universal Serial Bus (USB) devices provided with non-volatile memory, networked storage devices, and so on.

Devices implementing methods according to these disclosures can comprise hardware, firmware and/or software, and can take any of a variety of form factors. Examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for deployment of an application on a cloud computing environment, the method comprising:
    receiving, at an orchestration system, a request for deployment of the application, wherein the request includes at least an intent-based solution model, and the intent-based solution model is non-executable;
    translating, by the orchestration system, the intent-based solution model into a plurality of service functions, wherein the service functions are executable;
    recursively instantiating the plurality of service functions, wherein recursively instantiating the plurality of service functions includes, for each service function of the plurality of service functions beginning at a lowest level service:
        determining whether the cloud computing environment has sufficient resources to instantiate a service function of the plurality of service function and compliance with one or more network policies;
        in response to the cloud computing environment having sufficient resources to instantiate the service function and complying with the one or more network policies, instantiate the service function at the cloud computing environment;
        in response to the cloud computing environment not having sufficient resources to instantiate the service function or not complying with the one or more network policies, pausing instantiation, updating the intent-based solution model, re-translating the updated solution model, and begin instantiating an updated service function to an environment with sufficient resources and that complies with the one or more network policies; and
    deploying the application at least partially on a computing device with the instantiated plurality of service functions at the cloud computing environment and the environment with sufficient resources.

2. The method of claim 1 further comprising:
    deriving a solution descriptor from the intent-based solution model, the solution descriptor comprising a description of the plurality of service functions utilized by the application.

3. The method of claim 1, wherein translating the plurality of service functions comprises:
    obtaining the intent-based solution model of service descriptions for deploying the application from a database of an orchestrator system; and
    compiling the intent-based solution model for deploying the application.

4. The method of claim 3, further comprising:
receiving the intent-based solution model for deploying the distributed application through a user interface; and
storing the intent-based solution model in the database in communication with the orchestrator system.

5. The method of claim 1, further comprising:
creating an adapter for communication with the cloud computing environment; and
instantiating the adapter based on an adapter model to communicate with the cloud computing environment on the computing device, wherein the adapter model includes one or more service functions of the plurality of service functions.

6. The method of claim 1 wherein recursively instantiating the plurality of service functions comprises expanding capacity of the plurality of service functions.

7. The method of claim 1 wherein recursively instantiating the plurality of service functions comprises decreasing capacity of the plurality of service functions.

8. The method of claim 1 further comprising:
maintaining a lifecycle of the application, wherein maintaining the lifecycle of the application comprises un-deploying the application upon receiving an indication of a change in the intent-based solution model for deploying the application.

9. The method of claim 1 further comprising:
recursively instantiating a second plurality of service functions, the second plurality of services comprising a set of dependencies to the instantiated plurality of service functions.

10. An orchestrator of a cloud computing environment, the orchestrator comprising:
a processing device; and
a computer-readable medium connected to the processing device configured to store information and instructions that, when executed by the processing device, performs the operations of:
receiving a request for deployment of the application, wherein the request includes at least an intent-based solution model, and the intent-based solution model is non-executable;
translating the intent-based solution model into a plurality of service functions, wherein the service functions are executable;
recursively instantiating the plurality of service functions, wherein recursively instantiating the plurality of service functions includes, for each service function of the plurality of service functions beginning at a lowest level service:
determining whether the cloud computing environment has sufficient resources to instantiate a service function of the plurality of service functions and compliance with one or more network policies;
in response to the cloud computing environment having sufficient resources to instantiate the service function and compliance with the one or more network policies, instantiate the service function at the cloud computing environment;
in response to the cloud computing environment not having sufficient resources to instantiate the service function or and not complying with one or more network policies, pausing instantiation, updating the intent-based solution model, re-translating the updated solution model, and begin instantiating an updated service function to an environment with sufficient resources and that complies with one or more network policies; and
deploying the distributed application at least partially on a computing device with the instantiated plurality of service functions at the cloud computing environment and the environment with sufficient resources.

11. The orchestrator of claim 10 wherein recursively instantiating the plurality of service functions comprises expanding capacity of the plurality of service functions.

12. The orchestrator of claim 10 wherein recursively instantiating the plurality of service functions comprises decreasing capacity of the plurality of service functions.

13. A system for managing a cloud computing environment, the system comprising:
at least one computing device; and
an orchestrator of the cloud computing environment configured to:
receive a request for deployment of a distributed application, the request including at least an intent-based solution model, and the intent-based solution model is non-executable;
translating the intent-based solution model into a plurality of service functions wherein the service functions are executable;
recursively instantiate the plurality of service functions, wherein recursively instantiating the plurality of service functions includes, for each service function of the plurality of service functions beginning at a lowest level service:
determining whether the cloud computing environment has sufficient resources to instantiate a service function and compliance with one or more network policies;
in response to the cloud computing environment having sufficient resources to instantiate the service function and compliance with the one or more network policies, instantiate the service function at the cloud computing environment;
in response to the cloud computing environment not having sufficient resources to instantiate the service function or not complying with one or more network policies, pausing instantiation, updating the intent-based solution model, re-translating the updated solution model, and begin instantiating an updated service function to an environment with sufficient resources and that complies with the one or more network policies; and
deploy the distributed application at least partially on the computing device with the instantiated plurality of service functions at the cloud computing environment and the environment with sufficient resources.

14. The system of claim 13, wherein the system further comprises:
a database storing the intent-based solution model configured to deploy the distributed application, the intent-based solution model comprising a list of parameters for deployment of the distributed application.

15. The system of claim 14 further comprising:
a user interface, wherein the intent-based solution model configured to deploy the distributed application is received through the user interface for storage in the database.

16. The system of claim 14 wherein deploying the distributed application at least partially on the computing device comprises the orchestrator further configured to compile the intent-based solution model to create an application descriptor including the plurality of services functions utilized by the distributed application.

17. The system of claim 14 wherein the plurality of service functions utilized by the distributed application are identified in at least the intent-based solution model.

18. The system of claim 13 wherein the orchestrator is further configured to:
create an adapter for communication with the cloud computing environment; and
instantiate the adapter based on an adapter model to communicate with the cloud computing environment on the at least one computing device, wherein the adapter model includes one or more service functions of the plurality of service functions.

19. The system of claim 13 wherein recursively instantiating the plurality of service functions comprises expanding capacity of the plurality of service functions.

20. The system of claim 13 wherein recursively instantiating the plurality of service functions comprises decreasing capacity of the plurality of service functions.

* * * * *